S. HILDER.
RUBBER TREAD FOR BOOTS AND SHOES.
APPLICATION FILED JAN. 29, 1917.
1,330,633. Patented Feb. 10, 1920.
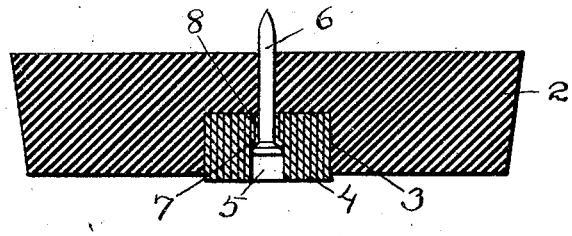
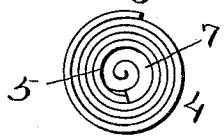 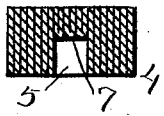 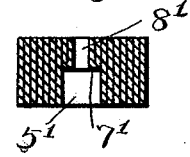
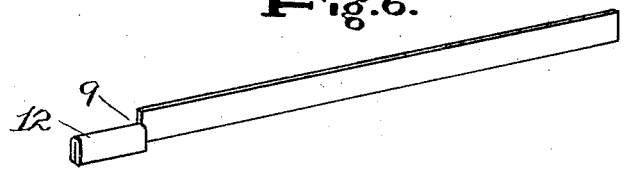
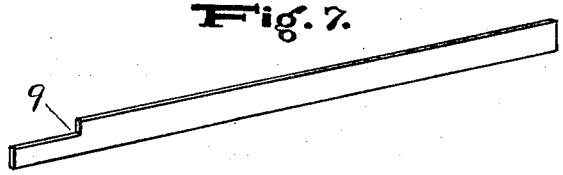
Inventor
Stuart Hilder,
By E. W. Anderson & Son
his Attorneys

UNITED STATES PATENT OFFICE.

STUART HILDER, OF GLENCARLYN, VIRGINIA, ASSIGNOR TO FRANK BERENSTEIN, OF CHELSEA, MASSACHUSETTS.

RUBBER TREAD FOR BOOTS AND SHOES.

1,330,633.     Specification of Letters Patent.     Patented Feb. 10, 1920.

Application filed January 29, 1917. Serial No. 145,187.

*To all whom it may concern:*

Be it known that I, STUART HILDER, a citizen of the United States, residing at Glencarlyn, in the county of Alexandria and State of Virginia, have made a certain new and useful Invention in Rubber Treads for Boots and Shoes, of which the following is a specification.

Figure 1 is a vertical section through a rubber heel, having a friction plug therein made in accordance with the invention and a securing nail driven through the plug and heel.

Fig. 2 is a central vertical section through a friction plug made in accordance with the invention.

Fig. 3 is a similar view of a modified form of the plug.

Fig. 4 is a bottom plan view of the plug shown in Fig. 2.

Fig. 5 is a plan view of a strip of frictionized canvas from which the plug is made, with the cut near one end thereof.

Fig. 6 is a perspective view of the same, with the material of one end folded upon itself.

Fig. 7 is a similar view of a modified form of notched strip.

The invention has relation to rubber heels and other tread elements of boots and shoes, and particularly to friction plugs for use therein, having for its object certain improvements upon a heel containing a plug of that type wherein a perforation is provided to receive a securing nail, as shown, for instance, in the Patent No. 1,173,088, granted to Frank Berenstein, the object being to secure the plug more positively to the heel and to do away with the interior or exterior post and the metal washer now employed in connection with the plug.

The invention consists in the novel construction and combinations of parts, as hereinafter set forth.

In the accompanying drawings, illustrating the invention, the numeral 2 designates a rubber heel, formed with a recess 3 in its tread face, and 4 is a plug rolled from a strip of frictionized canvas or other suitable material, inserted in the recess 3 and vulcanized or cemented to the walls thereof with its outer end approximately flush with the tread face of the heel. A recess 5 is formed in the tread face of the plug, designed to receive the head of a securing nail 6 for the heel, said recess terminating at its inner end in a bearing wall or shoulder 7. When the heel is applied to a boot or shoe the shank of the securing nail 6 will penetrate the upper portion of the plug at 8, as shown, the nail head engaging the shoulder 7 and lying well within the recess 5 of the plug.

The nail 6, by means of the bearing taken by its head upon the shoulder 7, is utilized to retain the plug positively in the heel, while the plug itself will form a washer or backing for the nail head of sufficient density to retain the heel solidly in position upon the shoe as secured by said nail. The metal washer customarily embedded in the rubber of the heel may thus be dispensed with, and, should it be desired to use a sufficient number of friction plugs to retain all the securing nails, the heel may be molded in a single lift, the vulcanization of the heel securing the plugs in place as firmly as necessary previous to application to the shoe. No metal washer being used in connection with the plug, the top of the plug will contact with and become vulcanized to the rubber material of the heel, a more secure adhesion resulting.

Preferably, the upper portion of the plug is solid, the nail shank when driven therethrough compressing the material above the shoulder 7, to form a more secure bearing for the head of the nail. If found desirable in manufacture, however, the plug may be formed tubularly on a mandril, leaving a perforation 8' for the shank of the nail, of less diameter than that of the recess 5', the shoulder 7', marginal to said perforation, being still present.

In forming the plug, the strip of canvas is notched at one end, as at 9, preferably by cutting the material part way across at 10 and folding the short end 11 longitudinally upon itself, the rubber with which the canvas is customarily treated providing for the adhesion of the folded parts. The strip is then rolled from the folded or notched end, the fold 12, in the preferred form of the invention, serving as an additional holding means for the head of the nail, by providing greater resistance at the shoulder 7. The notch may, however, be formed by cutting away a corner of the strip, as shown in Fig. 7 of the drawings.

I claim:

1. In a rubber tread element for boots and shoes, a friction plug formed from strip material, notched at one corner and helically wound from the notched end, said notched end providing a recessed bearing face in said plug.

2. In a rubber tread element for boots and shoes, a friction plug formed from strip material having a reduced end portion, said strip being helically wound from said reduced end, and said reduced end providing a recessed bearing face in said plug.

3. In a rubber tread element for boots and shoes, a friction plug formed from rectangular strip material folded longitudinally upon itself at one end, said strip being helically wound from the folded end and said folded end providing a recessed bearing face in said plug.

4. In a rubber tread element for boots and shoes, a friction plug formed from strip material transversely cut and folded longitudinally upon itself at one end, said strip being helically wound from the folded end and said folded end providing a recessed bearing face in said plug.

5. In a rubber tread element for boots and shoes, a friction plug formed from helically wound strip material, the inner convolutions of said strip being of less breadth than the outer convolutions thereof and providing a recessed bearing face in said plug.

In testimony whereof I affix my signature in presence of two witnesses.

STUART HILDER.

Witnesses:
GEORGE M. ANDERSON,
W. R. BAUM.